2,907,768

DIHYDROHYDROXYCODEINONE DERIVATIVE

Mozes Juda Lewenstein, Kew Gardens, N.Y.

No Drawing. Application November 15, 1956
Serial No. 622,244

1 Claim. (Cl. 260—285)

This invention relates to a novel compound of dihydrohydroxycodeinone and it has particular relation to the neutral compound formed by the interaction of equivalent amounts of dihydrohydroxycodeinone and terephthalic acid.

When preparing neutral salts of dibasic carboxylic acids with dihydrohydroxycodeinone, it has been found that many of these compounds are highly unstable, especially when exposed to air and humidity.

In many instances it is desirable to use organic bases in the form of their neutral salts with organic dibasic acids, but in therapeutical use the salts should be not only stable, but also well soluble in water so as to be easily absorbed by the body fluids.

I have now found that although the dibasic organic acids commonly used in pharmaceutical products do not provide, as a rule, salts having the beforementioned desirable properties, terephthalic acid easily provides a well defined, stable neutral salt with dihydrohydroxycodeinone. This salt is stable, well soluble in water and very satisfactory in use for therapeutic administration in powder and tablet form, as well as in solution.

The best mode of preparing the compound of the invention is to react the terephthalic acid with the necessary amount of dihydrohydroxycodeinone in a solvent, whereby the neutral salt is formed and then recover the salt by evaporation of the solvent.

*Example*

31.5 grams of dihydrohydroxycodeinone are dissolved in 800 cc. of methylalcohol and into this solution 8.31 grams of terephthalic acid are gradually introduced under stirring and boiling under reflux until a clear solution is formed. Upon evaporation of the solution, the neutral salt corresponding to the formula $C_{18}H_{21}NO_4 \cdot \frac{1}{2}C_8H_6O_4$ is obtained. It melts in the range of 230° to 265° C., is soluble in water and alcohol, and stable on storage.

The compound of the present invention is completely stable when exposed to warm and humid air and 1 gram of the compound is soluble in 1 cc. of water at ordinary room temperature.

Reference is made to my co-pending application filed in my name under Serial No. 458,025 on September 23, 1954, for "Neutral Salts of Morphine Derivatives," now abandoned, of which this is a continuation in part.

What is claimed is:

As a new compound, the neutral salt of terephthalic acid and dihydrohydroxycodeinone base, the latter having the structural formula

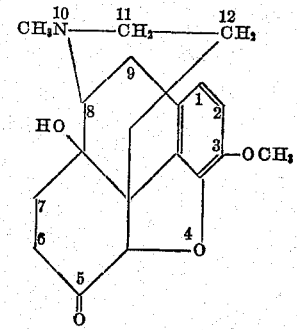

said salt being composed of one mol of said acid and 2 mols of said base, stable on storage in air and soluble in water and alcohol.

References Cited in the file of this patent

UNITED STATES PATENTS

| | | |
|---|---|---|
| 2,628,185 | Lewenstein | Feb. 10, 1953 |
| 2,630,400 | Lewenstein | Mar. 3, 1953 |
| 2,772,270 | Weiss | Nov. 27, 1956 |

OTHER REFERENCES

Bentley: The Chemistry of the Morphine Alkaloids, Clarendon Press, 1954, N. Y., p. 259.